United States Patent
Chen et al.

(10) Patent No.: US 10,366,516 B2
(45) Date of Patent: Jul. 30, 2019

(54) IMAGE PROCESSING METHOD AND DEVICE

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventors: Yunna Chen, Guangdong (CN); Jian He, Guangdong (CN); Shensian Syu, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/736,039

(22) PCT Filed: Dec. 5, 2017

(86) PCT No.: PCT/CN2017/114520
§ 371 (c)(1),
(2) Date: Dec. 13, 2017

(87) PCT Pub. No.: WO2019/041618
PCT Pub. Date: Mar. 7, 2019

(65) Prior Publication Data
US 2019/0066339 A1  Feb. 28, 2019

(30) Foreign Application Priority Data

Aug. 30, 2017  (CN) .......................... 2017 1 0760193

(51) Int. Cl.
G09G 5/02 (2006.01)
G09G 5/00 (2006.01)
(Continued)

(52) U.S. Cl.
CPC .............. G06T 11/001 (2013.01); G06T 5/00 (2013.01); G09G 5/02 (2013.01); G06T 3/20 (2013.01);
(Continued)

(58) Field of Classification Search
USPC ......... 345/589, 597, 604; 358/500, 520, 529
See application file for complete search history.

(56) References Cited

U.S. PATENT DOCUMENTS 5,359,436 A * 10/1994 Dichter .................... H04N 1/56
358/500
2013/0093483 A1* 4/2013 Lamanna ................ H03L 7/087
327/157
(Continued)

*Primary Examiner* — Wesner Sajous
(74) *Attorney, Agent, or Firm* — Muncy, Geissler, Olds & Lowe, P.C.

(57) ABSTRACT

An image processing method and device is provided. Components of a point $A_i(r_i,g_i,b_i)$ of an original image in RGB color space are processed according to a first function $f_1(x)$ to obtain $A_0(r_0,g_0,b_0)=f_1(x_i)$. The point $A_i(r_i,g_i,b_i)$ of the original image is processed according to a second function $f_2(x)$ to obtain a processed saturation $S_0=f_2(x_i)$. Let $f_2(x_i)=1$ to determine the point $A_0(r_0,g_0,b_0)$. The point $A_i$ is processed in the RGB color space if $\max(r_0,g_0,b_0)\leq 1$. The point $A_i$ is converted into CMY color space for image processing if $\max(r_0,g_0,b_0)>1$.

15 Claims, 4 Drawing Sheets

(51) Int. Cl.
*G06T 11/00* (2006.01)
*G06T 5/00* (2006.01)
*G06T 3/20* (2006.01)
*H04N 1/56* (2006.01)
*H04N 1/60* (2006.01)
*G06T 3/40* (2006.01)

(52) U.S. Cl.
CPC ........ *G06T 3/40* (2013.01); *G09G 2320/0242* (2013.01); *G09G 2340/06* (2013.01)

(56) References Cited

U.S. PATENT DOCUMENTS

2013/0328907 A1* 12/2013 Ballestad ............. H04N 1/6027
 345/590
2018/0040307 A1* 2/2018 McLin ................... G09G 5/393

\* cited by examiner

IMAGE PROCESSING METHOD AND DEVICE

CROSS REFERENCE TO RELATED APPLICATION

This application claims the priority of International Application No. PCT/CN2017/114520, filed on Dec. 5, 2017, which claims priority to Chinese Application No. 201710760193.4 filed on Aug. 30, 2017. The entire disclosures of each of the applications are incorporated herein by reference.

BACKGROUND

1. Field of Disclosure

The present disclosure relates to image processing technologies, and more particularly to an image processing method and device.

2. Description of Related Art

With improvements on living standards, demands on display quality of electronic products are increasingly high. In existing skills, in order to improve the display quality, image processing is performed during screen display. During the image processing, it is usually necessary to adjust saturation of images in order to make the display more colorful.

For color image saturation enhancement, it is very important to ensure no out-of-boundary issue for RGB color space and keep color tone unchanged. Color image enhancement is usually performed in HSI (Hue, Saturation, Intensity) and HSV (Hue, Saturation, Value) spaces through conversion. However, a color space transformation problem will occur in converting processed images back to the RGB space. Generally, cut-out approaches are adopted to map the out-of-boundary values to boundary values. This may cause some details to be lost and cause color tone to be changed. Further, this space transformation approach takes time, and is large in computation consumption and low in efficiency.

FIG. 1 is a flowchart of a method for enhancing saturation of an RGB color image using space transformation. First, the color image that is to be processed is converted into HSI space, its saturation is extracted, and the saturation is enhanced using a certain approach to obtain an enhanced saturation value. The processed HSI model is converted back to RGB model space using a model transformation formula. After normalization in the RGB model space, each RGB component is within a range of 0 to 1. The RGB component obtained from HSI model conversion has a problem that its value may exceed 1. By using a general cut-out approach, color tone may be inconsistent.

SUMMARY

The present invention provides an image processing method for solving image color tone inconsistence caused by being out of the boundaries of color space.

To achieve above object, technical schemes provided in the present disclosure are described below.

The present disclosure provides an image processing method, including:

Step S10: according to a first function $f_1(x)$, processing components of a point $A_i(r_i,g_i,b_i)$ of an original image in RGB color space to obtain $A_0(r_0,g_0,b_0)=f_1(x_i)$, where i is a natural number;

Step S20: according to a second function $f_2(x)$, processing the point $A_i(r_i,g_i,b_i)$ of the original image to obtain a processed saturation $S_0=f_2(x_i)$; and Step S30: letting $f_2(x_i)=1$ to determine the point $A_0(r_0, g_0,b_0)$, and processing the point $A_i$ in the RGB color space if $\max(r_0,g_0,b_0)$ converting the point $A_i$ into CMY color space for image processing if $\max(r_0,g_0,b_0)>1$.

In accordance with a preferred embodiment of the present disclosure, Step S10 includes:

Step S11: selecting the point $A_i(r_i,g_i,b_i)$ from the original image in the RGB color space; and Step S12: according to the first function $f_1(x)$, processing each component of the point $A_i$ of the original image in the RGB color space to obtain $A_0(r_0,g_0,b_0)=f_1(x_i)$, wherein processing each component of the point $A_i$ of the original image in the RGB color space is to stretch ($\alpha$) and translate ($\beta$) the components of the point $A_i$ in the RGB color space, where the first function is $f_1(x)=\alpha x+\beta$.

In accordance with a preferred embodiment of the present disclosure, Step S20 includes:

Step S21: selecting the point $A_i(r_i,g_i,b_i)$ from the original image in the RGB color space;

Step S22: according to a third function $f_3(x)$, determining saturation $S_i=f_3(x_i)$ of the point $A_i(r_i,g_i,b_i)$ of the original image; and Step S23: according to the second function $f_2(x)$, processing the saturation $S_i$ of the original image to obtain the processed saturation $S_0=f_2(x_i)$.

In accordance with a preferred embodiment of the present disclosure, the saturation of the point $A_i(r_i,g_i,b_i)$ of the original image is $$S_i = 1 - 3 \times \frac{\min[r_i, g_i, b_i]}{r_i + g_i + b_i};$$

and the processed saturation obtained by processing the saturation $S_i$ of the original image according to the second function $f_2(x)$ is $$S_0 = f_2(x) = 1 - 3 \times \frac{\alpha \cdot \min[r_i, g_i, b_i] + \beta}{r_i + g_i + b_i}.$$

In accordance with a preferred embodiment of the present disclosure, brightness of the original image remains unchanged before and after image processing, and values of $\alpha$ and $\beta$ in $f_1(x)$ are obtained using $S_0=f_2(x_i)$ and $A_0(r_0,g_0,b_0)=f_1(x_i)$.

In accordance with a preferred embodiment of the present disclosure, the CMY color space is a color model based on subtractive color mixture, and the point $A_i$ is processed in the CMY color space using a fourth function $f_4(x)=1-x$, where x represents each component of the point $A_i(r_i,g_i,b_i)$ in the RGB color space.

The present disclosure further provides an image processing device, including:

an image processing module configured to process components of a point $A_i(r_i,g_i,b_i)$ of an original image in RGB color space according to a first function $f_1(x)$ to obtain $A_0(r_0,g_0,b_0)=f_1(x_i)$, where i is a natural number, process the point $A_i(r_i,g_i,b_i)$ of the original image according to a second function $f_2(x)$ to obtain a processed saturation $S_0=f_2(x_i)$, determine the point $A_0(r_0,g_0,b_0)$, process the point $A_i$ in the RGB color space if $\max(r_0,g_0,b_0)\leq 1$, and convert the point $A_i$ into CMY color space for image processing if $\max(r_0,g_0,b_0)>1$.

In accordance with a preferred embodiment of the present disclosure, the image processing module is configured to stretch ($\alpha$) and translate ($\beta$) each component of the point $A_i$ of the original image in the RGB color space, where the first function is $f_1(x)=\alpha x+\beta$.

In accordance with a preferred embodiment of the present disclosure, the image processing module is configured to determine saturation $S_i=f_3(x_i)$ of the point $A_i(r_i,g_i,b_i)$ of the original image according to a third function $f_3(x)$, where $$S_i = 1 - 3 \times \frac{\min[r_i, g_i, b_i]}{r_i + g_i + b_i};$$

and the image processing module is further configured to process the saturation $S_i$ of the original image according to the second function $f_2(x)$ to obtain the processed saturation $$S_0 = f_2(x) = 1 - 3 \times \frac{\alpha \cdot \min[r_i, g_i, b_i] + \beta}{r_i + g_i + b_i}.$$

The present disclosure further provides an image processing method, including:

Step S10: according to a first function $f_1(x)$, processing components of a point $A_i(r_i,g_i,b_i)$ of an original image in RGB color space to obtain $A_0(r_0,g_0,b_0)=f_1(x_i)$, where i is a natural number;

Step S20: according to a second function $f_2(x)$, processing the point $A_i(r_i,g_i,b_i)$ of the original image to obtain a processed saturation $S_0=f_2(x_i)$; and Step S30: letting $f_2(x_i)=1$ to determine the point $A_0(r_0,g_0,b_0)$, and processing the point $A_i$ in the RGB color space if $\max(r_0,g_0,b_0)\leq 1$; using a fourth function $f_4(x)$ to convert the point $A_i$ into CMY color space for image processing if $\max(r_0,g_0,b_0)>1$.

In accordance with a preferred embodiment of the present disclosure, Step S10 includes:

Step S11: selecting the point $A_i(r_i,g_i,b_i)$ from the original image in the RGB color space; and Step S12: according to the first function $f_1(x)$, processing each component of the point $A_i$ of the original image in the RGB color space to obtain $A_0(r_0,g_0,b_0)=f_1(x_i)$, wherein processing each component of the point $A_i$ of the original image in the RGB color space is to stretch ($\alpha$) and translate ($\beta$) the components of the point $A_i$ in the RGB color space, where the first function is $f_1(x)=\alpha x+\beta$.

In accordance with a preferred embodiment of the present disclosure, Step S20 includes:

Step S21: selecting the point $A_i(r_i,g_i,b_i)$ from the original image in the RGB color space;

Step S22: according to a third function $f_3(x)$, determining saturation $S_i=f_3(x_i)$ of the point $A_i(r_i,g_i,b_i)$ of the original image; and Step S23: according to the second function $f_2(x)$, processing the saturation $S_i$ of the original image to obtain the processed saturation $S_0=f_2(x_i)$.

In accordance with a preferred embodiment of the present disclosure, the saturation of the point $A_i(r_i,g_i,b_i)$ of the original image is $$S_i = 1 - 3 \times \frac{\min[r_i, g_i, b_i]}{r_i + g_i + b_i};$$

and the processed saturation obtained by processing the saturation $S_i$ of the original image according to the second function $f_2(x)$ is $$S_0 = f_2(x) = 1 - 3 \times \frac{\alpha \cdot \min[r_i, g_i, b_i] + \beta}{r_i + g_i + b_i}.$$

In accordance with a preferred embodiment of the present disclosure, brightness of the original image remains unchanged before and after image processing, and values of $\alpha$ and $\beta$ in $f_1(x)$ are obtained using $S_0=f_2(x_i)$ and $A_0(r_0,g_0,b_0)=f_1(x_i)$.

In accordance with a preferred embodiment of the present disclosure, the CMY color space is a color model based on subtractive color mixture, and the point $A_i$ is processed in the CMY color space using a fourth function $f_4(x)=1-x$, where x represents each component of the point $A_i(r_i,g_i,b_i)$ in the RGB color space.

Beneficial effects of the present disclosure are described below. The present disclosure provides an image processing method and device. Points of an original image in its color space are filtered. By performing space transformation for the points that may be out of boundary, the present disclosure can efficiently solve the image distortion issue caused by being out of the boundaries of the color space, ensure unchanged color tone, and improve display quality. Also, image saturation is enhanced in the RGB color space and computing power is improved.

BRIEF DESCRIPTION OF DRAWINGS

For explaining the technical schemes used in the conventional skills and the embodiments of the present disclosure more clearly, the drawings to be used in describing the embodiments or the conventional skills will be briefly introduced in the following. Obviously, the drawings below are only some embodiments of the present disclosure, and those of ordinary skill in the art can further obtain other drawings according to these drawings without making any inventive effort.

DETAILED DESCRIPTION OF PREFERRED EMBODIMENTS

The following descriptions for the respective embodiments are specific embodiments capable of being implemented for illustrating the present disclosure with referring to the appended figures. In describing the present disclosure, spatially relative terms such as "upper", "lower", "front", "back", "left", "right", "inner", "outer", "lateral", and the like, may be used herein for ease of description as illustrated in the figures. Therefore, the spatially relative terms used herein are intended to illustrate the present disclosure for ease of understanding, but are not intended to limit the present disclosure. In the appending drawings, units with similar structures are indicated by the same reference numbers.

In existing image processing methods, color images are converted into HSI (Hue, Saturation, Intensity) and HSV (Hue, Saturation, Value) color spaces and are processed in these color spaces. When they are converted back to RGB color space, some details may be lost and color tone may be changed because of being out of the boundaries of the color space. The present disclosure provides an image processing method, and embodiments of the present disclosure can avoid these drawbacks.

Figure 1:
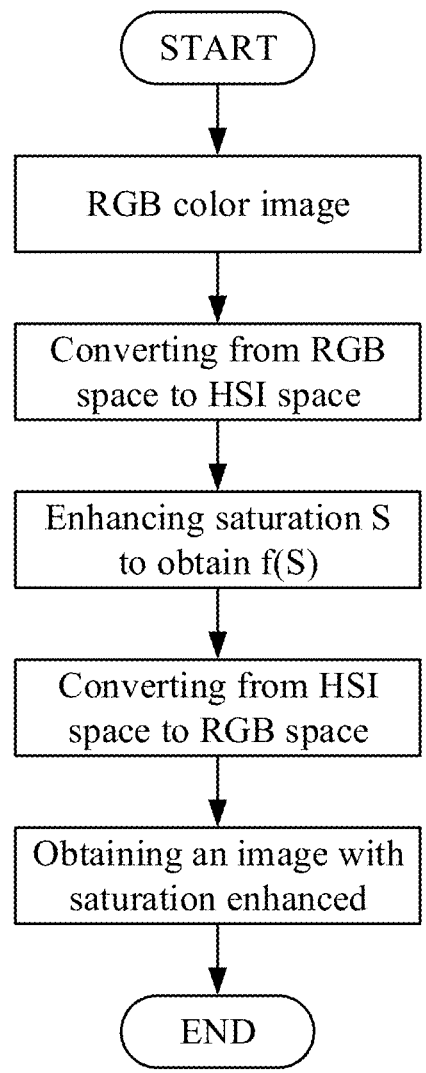
FIG. 1 is a basic image processing flowchart in an existing skill.
Figure 2:
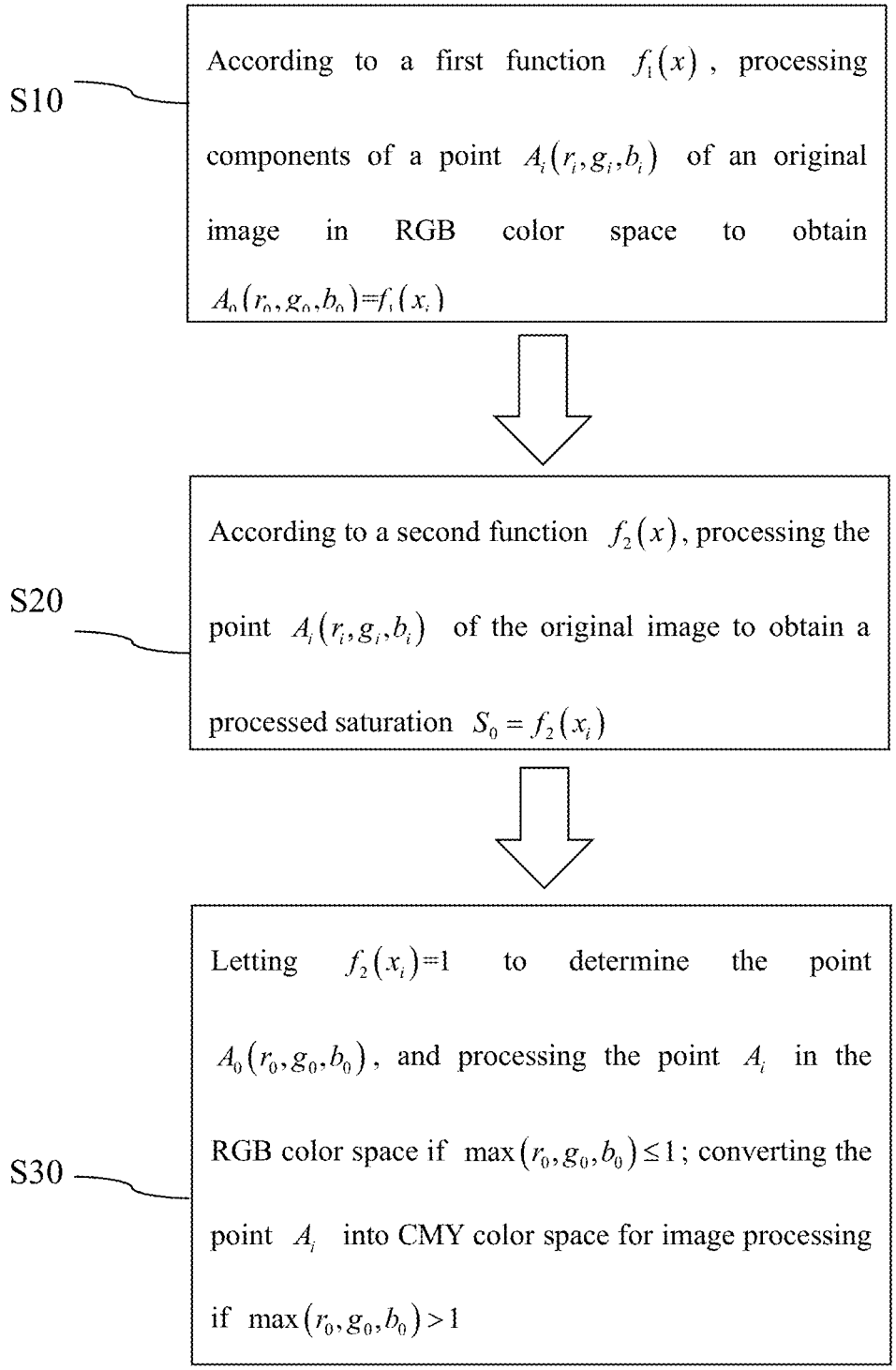
FIG. 2 is a flowchart of an image processing method in accordance with a first embodiment of the present disclosure.

FIG. 2 is a flowchart of an image processing method in accordance with a first preferred embodiment of the present disclosure. The method includes the following steps.

In Step S10, components of a point $A_i(r_i,g_i,b_i)$ of an original image in RGB color space is processed according to a first function $f_1(x)$ to obtain $A_0(r_0,g_0,b_0)=f_1(x_i)$, where i is a natural number.

In the RGB color space, the point $A_i(r_i,g_i,b_i)$ is selected from the original image. Each component of the point $A_i$ of the original image is processed in the RGB color space according to the first function $f_1(x)$ to obtain $A_0(r_0,g_0,b_0)=f_1(x_i)$.

Processing each component of the point $A_i$ of the original image in the RGB color space is to stretch ($\alpha$) and translate ($\beta$) the components of the point $A_i$ in the RGB color space.

In Step S20, the point $A_i(r_i,g_i,b_i)$ of the original image is processed according to a second function $f_2(x)$ to obtain a processed saturation $S_0=f_2(x_i)$.

In the RGB color space, the point $A_i(r_i,g_i,b_i)$ is selected from the original image. Saturation $S_i=f_3(x_i)$ of the point $A_i(r_i,g_i,b_i)$ of the original image is determined according to a third function $f_3(x)$. The saturation $S_i$ of the original image is processed according to the second function $f_2(x)$ to obtain the processed saturation $S_0=f_2(x_i)$.

The saturation is obtained according to $$S_i = 1 - 3 \times \frac{\min[r_i, g_i, b_i]}{r_i + g_i + b_i}.$$

The processed saturation is obtained according to $$S_0 = f_2(x) = 1 - 3 \times \frac{\alpha \cdot \min[r_i, g_i, b_i] + \beta}{r_i + g_i + b_i}.$$

Brightness of the original image remains unchanged before and after image processing, and values of $\alpha$ and $\beta$ in $f_1(x)$ are obtained using $S_0=f_2(x_i)$ and $A_0(r_0,g_0,b_0)=f_1(x_i)$.

In Step S30, let $f_2(x_i)=1$ to determine the point $A_0(r_0,g_0,b_0)$. The point $A_i$ is processed in the RGB color space if $\max(r_0,g_0,b_0) \le 1$.

If $\max(r_0,g_0,b_0)>1$, the point $A_i$ is converted into CMY color space for image processing.

In the above formulas, let $f_2(x_i)=1$ to determine values of $r_0,g_0,b_0$ for the point $A_0(r_0,g_0,b_0)$.

According to a size of the obtained values of $r_0,g_0,b_0$, select a corresponding color space to process the point $A_i$.

If $\max(r_0,g_0,b_0) \le 1$, the point $A_i$ is processed in the RGB space using the second function $f_2(x)$. If $\max(r_0,g_0,b_0)>1$, the point $A_i$ is converted into CMY color space using a fourth function $f_4(x)$ and processed in the CMY color space.

The converted point is processed in the CMY color space. After being processed, the point is converted from the CMY color space to the RGB color space using the fourth function $f_4(x)$ again.

The CMY color space is a color model based on subtractive color mixture. The fourth function is $f_4(x)=1-x$, where x represents each component of the point $A_i(r_i,g_i,b_i)$ in the RGB color space.

For instance, a point $A_i(r_i,g_i,b_i)$ is selected in the RGB color space, where i is a natural number. After being processed in the RGB color space, the point is noted as $A_0(r_0,g_0,b_0)$.

(1) The first function $f_1(x)=\alpha x+\beta$ is used to stretch ($\alpha$) and translate ($\beta$) the point $A_i(r_i,g_i,b_i)$ in the RGB color space to obtain the following equations:

$$r_0=\alpha r_i+\beta \quad (1\text{-}1)$$

$$g_0=\alpha g_i+\beta \quad (1\text{-}2)$$

$$b_0=\alpha b_i+\beta \quad (1\text{-}3)$$

(2) Brightness of the original image remains unchanged before and after image processing. Based on this principle, the following equations are obtained:

$$l_i=r_i+g_i+b_i \quad (1\text{-}4)$$

$$l_0=r_0+g_0+b_0 \quad (1\text{-}5)$$

According to equations (1-1)~(1-5), a relation between $\alpha$ and $\beta$ is obtained:

$$r_i+g_i+b_i=\alpha(r_i+g_i+b_i)+\beta \quad (1\text{-}6)$$

(3) Saturation of the point $A_i(r_i,g_i,b_i)$ of the original image is determined according to the third function $f_3(x)$. The following equation is obtained:

$$S_i = 1 - 3 \times \frac{\min[r_i, g_i, b_i]}{r_i + g_i + b_i} \quad (1\text{-}7)$$

(4) The saturation $S_i$ of the original image is processed according to the second function $f_2(x)$ to obtain a processed saturation $S_0$ as below:

$$S_0 = f_2(x) = 1 - 3 \times \frac{\alpha \cdot \min[r_i, g_i, b_i] + \beta}{r_i + g_i + b_i} \quad (1\text{-}8)$$

Accordingly, values of $\alpha$ and $\beta$ can be obtained according to equations (1-6) and (1-8).

In equation (1-8), let $f_2(x_i)=1$ to determine values of $r_0,g_0,b_0$ for the point $A_0(r_0,g_0,b_0)$. According to a size of the obtained values of $r_0,g_0,b_0$, select a corresponding color space to process the point $A_i$.

If $\max(r_0,g_0,b_0) \le 1$, the point $A_i$ is processed in the RGB space using the second function $f_2(x)$. If $\max(r_0,g_0,b_0)>1$, the point $A_i$ is converted into CMY color space using a fourth function $f_4(x)$ and processed in the CMY color space.

(5) According to the fourth function $f_4(x)$, the point $A_i(r_i,g_i,b_i)$ is processed in the CMY color space to obtain a point $A_i(c_i,m_i,y_i)$ in the CMY color space as below:

$$c_i=1-r_i \tag{1-9}$$

$$m_i=1-g_i \tag{1-10}$$

$$y_i=1-b_i \tag{1-11}$$

(6) The first function $f_1(x)=\alpha x+\beta$ is used to stretch ($\alpha$) and translate ($\beta$) the point $A_i(c_i,m_i,y_i)$ in the CMY color space to obtain a processed point $A_0(c_0,m_0,y_0)$ as below:

$$c_0=\alpha c_i+\beta \tag{1-12}$$

$$m_0=\alpha m_i+\beta \tag{1-13}$$

$$y_0=\alpha y_i+\beta \tag{1-14}$$

(7) The saturation $S_i$ of the original image is processed according to the second function $f_2(x)$ to obtain a processed saturation $S_0$ as below:

$$S_0 = f_2(x) = 1 - 3 \times \frac{\alpha \cdot \min[c_i, m_i, y_i] + \beta}{c_i + m_i + y_i} \tag{1-15}$$

(8) The point $A_0(c_0,m_0,y_0)$ is converted from the CMY color space into the RGB color space using the fourth function $f_4(x)$, as below:

$$r_0=1-c_0 \tag{1-16}$$

$$g_0=1-m_0 \tag{1-17}$$

$$b_0=1-y_0 \tag{1-18}$$

Accordingly, the afore-described method can filter points of the original image and perform space transformation for the points that may be out of boundary to solve the out-of-boundary issue.

Figure 3:
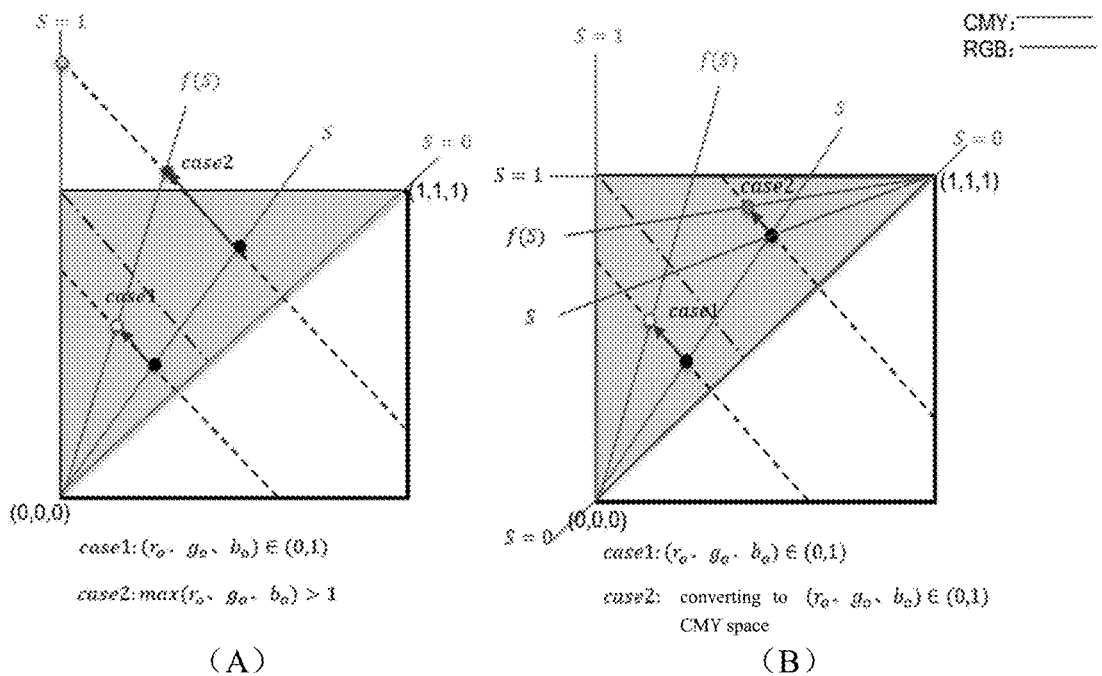
FIG. 3 illustrates a comparison between an existing skill and the present disclosure in color image saturation enhancing approaches in RGB color space in accordance with a first embodiment of the present disclosure.

FIG. 3 is a schematic diagram illustrating a cross section of RGB color space from brightness (0, 0, 0) to (1, 1, 1), where S is saturation and $f(S)$ is a saturation enhancing function $f_2(x)$.

FIG. 3A corresponds to a traditional saturation enhancing method. In case 1, $r_o,g_o,b_o$ are within 0 to 1 after the saturation is enhanced. In case 2, after the saturation is enhanced, a maximum of $r_o,g_o,b_o$ may exceed the range of 0 to 1, i.e., exceeding the boundary of the color space. Generally, cut-out approaches are adopted to solve the out-of-boundary issue. However, this may cause a color tone change before and after the image processing.

FIG. 3B corresponds to an improvement provided in this patent application. As can be seen from this figure, the points in case 2 are converted into the CMY color space. This can ensure the saturation to be within the range of 0 to 1 and will not cause the out-of-boundary issue.

Figure 5:
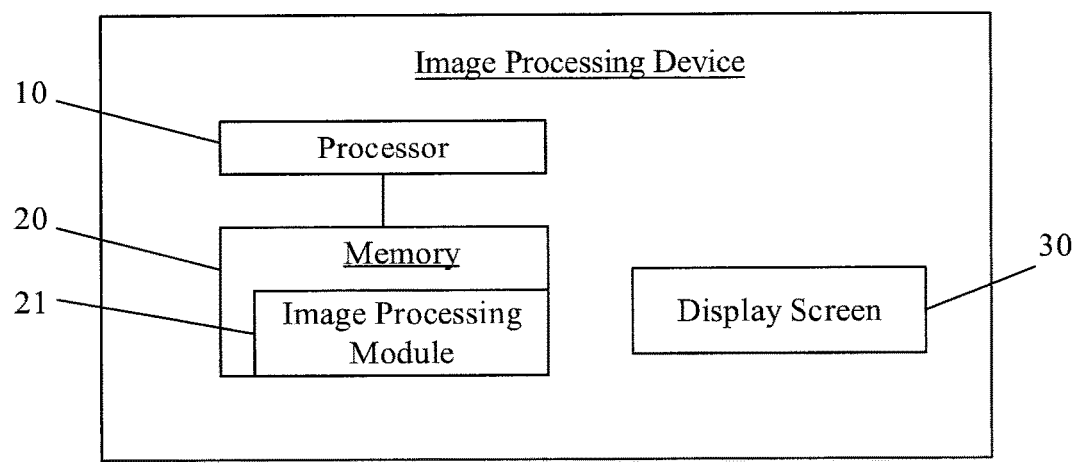
FIG. 5 is a block diagram showing an image processing device in accordance with an embodiment of the present disclosure.

The present disclosure further provides an image processing device. As shown in FIG. 5, the device includes a processor 10, a memory 20, and a display screen 30. The memory 20 is connected with the processor 10. The memory 20 includes a plurality of program instructions executable by the processor 10 to execute the afore-described image processing method. The plural program instructions form an image processing module 21. The display screen 30 is configured to display an image having the points with saturation enhanced.

Firstly, in the image processing module, a point $A_i(r_i,g_i,b_i)$ is selected from the original image in the RGB color space. Each component of the point $A_i$ of the original image is processed in the RGB color space according to the first function $f_1(x)=\alpha x+\beta$ to obtain a processed point $A_0(r_0,g_0,b_0)=f_1(x_i)$.

The image processing is to stretch ($\alpha$) and translate ($\beta$) each component of the point $A_i$ of the original image in the RGB color space.

After that, in the image processing module, the point $A_i(r_i,g_i,b_i)$ is selected from the original image in the RGB color space. Saturation $S_i=f_3(x_i)$ of the point $A_i(r_i,g_i,b_i)$ of the original image is determined according to the third function $f_3(x)$. The saturation $S_i$ of the original image is processed according to the second function $f_2(x)$ to obtain a processed saturation $S_0=f_2(x_i)$.

The saturation is obtained according to $$S_i = 1 - 3 \times \frac{\min[r_i, g_i, b_i]}{r_i + g_i + b_i}.$$

The processed saturation is obtained according to $$S_0 = f_2(x) = 1 - 3 \times \frac{\alpha \cdot \min[r_i, g_i, b_i] + \beta}{r_i + g_i + b_i}.$$

Brightness of the original image remains unchanged before and after image processing, and values of $\alpha$ and $\beta$ in $f_1(x)$ are obtained using $S_0=f_2(x_i)$ and $A_0(r_0,g_0,b_0)=f_1(x_i)$.

Finally, in the image processing module, let $f_2(x_i)=1$ to determine values $r_0,g_0,b_0$ of for the point $A_0(r_0,g_0,b_0)$. According to a size of the obtained values of $r_0,g_0,b_0$, select a corresponding color space to process the point $A_i$.

If $\max(r_0,g_0,b_0)\le 1$, the point $A_i$ is processed in the RGB space using the second function $f_2(x)$. If $\max(r_0,g_0,b_0)>1$, the point $A_i$ is converted into CMY color space using a fourth function $f_4(x)$ and processed in the CMY color space.

The converted point is processed in the CMY color space. After being processed, the point is converted from the CMY color space to the RGB color space using the fourth function $f_4(x)$ again.

The CMY color space is a color model based on subtractive color mixture. The fourth function is $f_4(x)=1-x$, where x represents each component of the point $A_i(r_i,g_i,b_i)$ in the RGB color space.

For instance, a point $A_i(r_i,g_i,b_i)$ is selected in the RGB color space, where i is a natural number. After being processed in the RGB color space, the point is noted as $A_0(r_0,g_0,b_0)$.

(1) The first function $f_1(x)=\alpha x+\beta$ is used to stretch ($\alpha$) and translate ($\beta$) the point $A_i(r_i,g_i,b_i)$ in the RGB color space to obtain the following equations:

$$r_0=\alpha r_i+\beta \tag{2-1}$$

$$g_0=\alpha g_i+\beta \tag{2-2}$$

$$b_0=\alpha b_i+\beta \tag{2-3}$$

(2) Brightness of the original image remains unchanged before and after image processing. Based on this principle, the following equations are obtained:

$$l_i=r_i+g_i+b_i \tag{2-4}$$

$$l_0=r_0+g_0+b_0 \tag{2-5}$$

According to equations (2-1)~(2-5), a relation between $\alpha$ and $\beta$ is obtained:

$$r_i+g_i+b_i=\alpha(r_i+g_i+b_i)+\beta \tag{2-6}$$

(3) Saturation of the point $A_i(r_i,g_i,b_i)$ of the original image is determined according to the third function $f_3(x)$. The following equation is obtained:

$$S_i = 1 - 3 \times \frac{\min[r_i, g_i, b_i]}{r_i + g_i + b_i} \tag{2-7}$$

(4) The saturation $S_i$ of the original image is processed according to the second function $f_2(x)$ to obtain a processed saturation $S_O$ as below:

$$S_0 = f_2(x) = 1 - 3 \times \frac{\alpha \cdot \min[r_i, g_i, b_i] + \beta}{r_i + g_i + b_i} \tag{2-8}$$

Accordingly, values of α and β can be obtained according to equations (2-6) and (2-8).

In equation (2-8), let $f_2(x_i)=1$ to determine values of $r_0,g_0,b_0$ for the point $A_0(r_0,g_0,b_0)$. According to a size of the obtained values of $r_0,g_0,b_0$, select a corresponding color space to process the point $A_i$.

If $\max(r_0,g_0,b_0) \leq 1$, the point $A_i$ is processed in the RGB space using the second function $f_2(x)$. If $\max(r_0,g_0,b_0) > 1$, the point $A_i$ is converted into CMY color space using a fourth function $f_4(x)$ and processed in the CMY color space.

(5) According to the fourth function $f_4(x)$, the point $A_i(r_i,g_i,b_i)$ is processed in the CMY color space to obtain a point $A_i(c_i,m_i,y_i)$ in the CMY color space as below:

$$c_i = 1 - r_i \tag{2-9}$$

$$m_i = 1 - g_i \tag{2-10}$$

$$y_i = 1 - b_i \tag{2-11}$$

(6) The first function $f_1(x) = \alpha x + \beta$ is used to stretch (α) and translate (β) the point $A_i(c_i,m_i,y_i)$ in the CMY color space to obtain a processed point $A_0(c_0,m_0,y_0)$ as below:

$$c_0 = \alpha c_i + \beta \tag{2-12}$$

$$m_0 = \alpha m_i + \beta \tag{2-13}$$

$$y_0 = \alpha y_i + \beta \tag{2-14}$$

(7) The saturation $S_i$ of the original image is processed according to the second function $f_2(x)$ to obtain a processed saturation $S_O$ as below:

$$S_0 = f_2(x) = 1 - 3 \times \frac{\alpha \cdot \min[c_i, m_i, y_i] + \beta}{c_i + m_i + y_i} \tag{2-15}$$

(8) The point $A_0(c_0,m_0,y_0)$ is converted from the CMY color space into the RGB color space using the fourth function $f_4(x)$, as below:

$$r_0 = 1 - c_0 \tag{2-16}$$

$$g_0 = 1 - m_0 \tag{2-17}$$

$$b_0 = 1 - y_0 \tag{2-18}$$

Accordingly, the afore-described method can filter points of the original image and perform space transformation for the points that may be out of boundary to solve the out-of-boundary issue.

Figure 4:
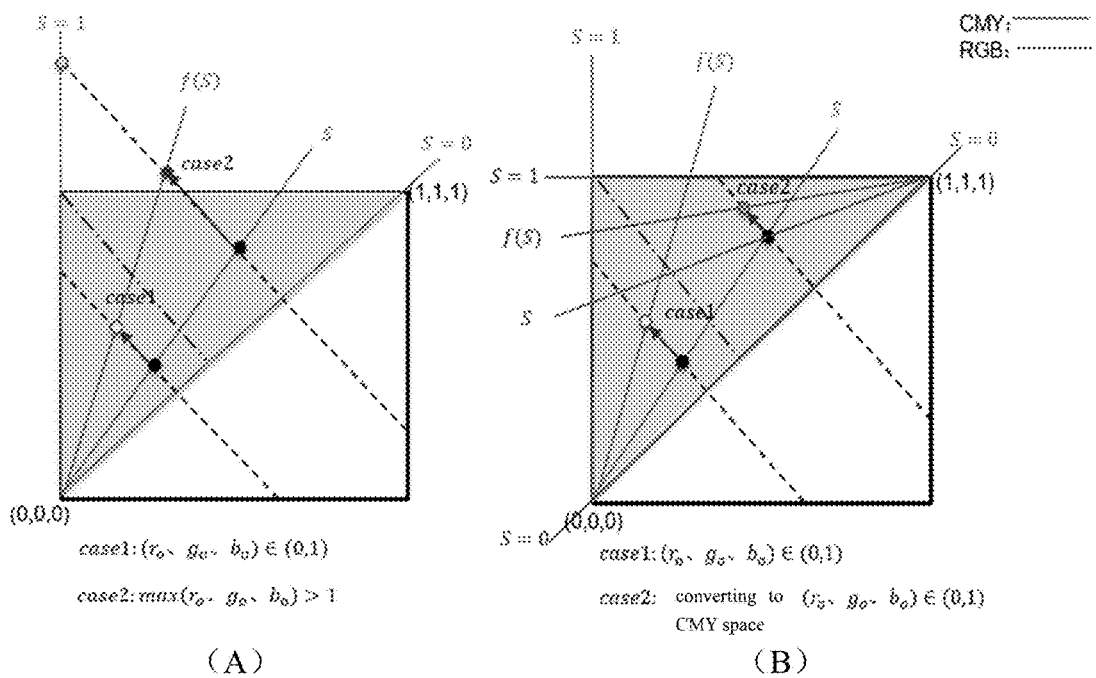
FIG. 4 illustrates a comparison between an existing skill and the present disclosure in color image saturation enhancing approaches in RGB color space in accordance with a second embodiment of the present disclosure.

FIG. 4 is a schematic diagram illustrating a cross section of RGB color space from brightness (0, 0, 0) to (1, 1, 1), where S is saturation and $f(S)$ is a saturation enhancing function $f_2(x)$.

FIG. 4A corresponds to a traditional saturation enhancing method. In case 1, $r_o,g_o,b_o$ are within 0 to 1 after the saturation is enhanced. In case 2, after the saturation is enhanced, a maximum of $r_o,g_o,b_o$ may exceed the range of 0 to 1, i.e., exceeding the boundary of the color space. Generally, cut-out approaches are adopted to solve the out-of-boundary issue. However, this may cause a color tone change before and after the image processing.

FIG. 4B corresponds to an improvement provided in this patent application. As can be seen from this figure, the points in case 2 are converted into the CMY color space. This can ensure the saturation to be within the range of 0 to 1 and will not cause the out-of-boundary issue.

The present disclosure provides an image processing method and device. Each component of a certain point of an original image is processed in RGB color space. The points of the original image in the RGB color space are filtered according to the processed results. By performing space transformation for the points that may be out of the boundary and converting them from the RGB color space into CMY color space, the present disclosure can efficiently solve the image distortion issue caused by being out of the boundaries of the color space, ensure unchanged color tone, and improve display quality. Also, image saturation is enhanced in the RGB color space and computing power is improved.

Above all, while the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

The invention claimed is:

1. An image processing method, comprising:
utilizing a processor and a memory to stretch and translate components of a point $A_i(r_i,g_i,b_i)$ of an original image in RGB color space according to a first function $f_1(x)$ to obtain $A_0(r_0,g_0,b_0)=f_1(x_i)$, where i is a natural number;
utilizing the processor and the memory to process saturation $S_i$ of the point $A_i(r_i,g_i,b_i)$ of the original image according to a second function $f_2(x)$ with stretching and translating operations to obtain a processed saturation $S_0=f_2(x_i)$;
determining the point $A_0(r_0,g_0,b_0)$ based on remaining brightness of the original image unchanged before and after the stretching and translating and based on a maximum output of the second function $f_2(x)$, and processing the point $A_i$ in the RGB color space for saturation enhancement if $\max(r_0,g_0,b_0) \leq 1$; converting the point $A_i$ into CMY color space for saturation enhancement if $\max(r_0,g_0,b_0) > 1$; and
displaying an image having the points with saturation enhanced, on a display screen.

2. The method according to claim 1, wherein the processing step according to the first function comprises:
selecting the point $A_i(r_i,g_i,b_i)$ from the original image in the RGB color space; and according to the first function $f_1(x)$, processing each component of the point $A_i$ of the original image in the RGB color space to obtain $A_0(r_0,g_0,b_0)=f_1(x_i)$, wherein processing each component of the point $A_i$ of the original image in the RGB color space is to stretch ($\alpha$) and translate ($\beta$) the components of the point $A_i$ in the RGB color space, where the first function is $f_1(x)=\alpha x+\beta$.

3. The method according to claim 1, wherein the processing step according to the second function comprises:
selecting the point $A_i(r_i,g_i,b_i)$ from the original image in the RGB color space;
according to a third function $f_3(x)$, determining saturation $S_i=f_3(x_i)$ of the point $A_i(r_i,g_i,b_i)$ of the original image; and
according to the second function $f_2(x)$, processing the saturation $S_i$ of the original image to obtain the processed saturation $S_0=f_2(x_i)$.

4. The method according to claim 3, wherein the saturation of the point $A_i(r_i,g_i,b_i)$ of the original image is $$S_i = 1 - 3 \times \frac{\min[r_i, g_i, b_i]}{r_i + g_i + b_i};$$

and
the processed saturation obtained by processing the saturation $S_i$ of the original image according to the second function $f_2(x)$ is $$S_0 = f_2(x) = 1 - 3 \times \frac{\alpha \cdot \min[r_i, g_i, b_i] + \beta}{r_i + g_i + b_i}.$$

5. The method according to claim 1, wherein brightness of the original image remains unchanged before and after image processing, and values of $\alpha$ and $\beta$ in $f_1(x)$ are obtained using $S_0=f_2(x_i)$ and $A_0(r_0,g_0,b_0)=f_1(x_i)$.

6. The method according to claim 1, wherein the CMY color space is a color model based on subtractive color mixture, and the point $A_i$ is processed in the CMY color space using a fourth function $f_4(x)=1-x$, where x represents each component of the point $A_i(r_i,g_i,b_i)$ in the RGB color space.

7. An image processing device, comprising:
a processor; and
a memory connected with the processor, the memory comprising a plurality of program instructions executable by the processor configured to execute a method, the method comprising:
stretching and translating components of a point $A_i(r_i,g_i,b_i)$ of an original image in RGB color space according to a first function $f_1(x)$ to obtain $A_0(r_0,g_0,b_0)=f_1(x_i)$, where i is a natural number, processing saturation $S_i$ of the point $A_i(r_i,g_i,b_i)$ of the original image according to a second function $f_2(x)$ with stretching and translating operations to obtain a processed saturation $S_0=f_2(x_i)$, determining the point $A_0(r_0,g_0,b_0)$ based on remaining brightness of the original image unchanged before and after the stretching and translating and based on a maximum output of the second function $f_2(x)$, processing the point $A_i$ in the RGB color space for saturation enhancement if $\max(r_0,g_0,b_0) \leq 1$, and converting the point $A_i$ into CMY color space for saturation enhancement if $\max(r_0,g_0,b_0)>1$.

8. The device according to claim 7, wherein the method further comprises stretching ($\alpha$) and translating ($\beta$) each component of the point $A_i$ of the original image in the RGB color space, where the first function is $f_1(x)=\alpha x+\beta$.

9. The device according to claim 7, wherein the method further comprises determining saturation $S_i=f_3(x_i)$ of the point $A_i(r_i,g_i,b_i)$ of the original image according to a third function $f_3(x)$, where $$S_i = 1 - 3 \times \frac{\min[r_i, g_i, b_i]}{r_i + g_i + b_i};$$

and
processing the saturation $S_i$ of the original image according to the second function $f_2(x)$ to obtain the processed saturation $$S_0 = f_2(x) = 1 - 3 \times \frac{\alpha \cdot \min[r_i, g_i, b_i] + \beta}{r_i + g_i + b_i}.$$

10. An image processing method, comprising:
utilizing a processor and a memory to stretch and translate components of a point $A_i(r_i,g_i,b_i)$ of an original image in RGB color space according to a first function $f_1(x)$ to obtain $A_0(r_0,g_0,b_0)=f_1(x_i)$, where i is a natural number;
utilizing the processor and the memory to process saturation $S_i$ of the point $A_i(r_i,g_i,b_i)$ of the original image according to a second function $f_2(x)$ with stretching and translating operations to obtain a processed saturation $S_0=f_2(x_i)$;
determining the point $A_0(r_0,g_0,b_0)$ based on remaining brightness of the original image unchanged before and after the stretching and translating and based on a maximum output of the second function $f_2(x)$, and processing the point $A_i$ in the RGB color space for saturation enhancement if $\max(r_0,g_0,b_0) \leq 1$; using a fourth function $f_4(x)$ to convert the point $A_i$ into CMY color space for saturation enhancement if $\max(r_0,g_0,b_0)>1$; and
displaying an image having the points with saturation enhanced, on a display screen.

11. The method according to claim 10, wherein the processing step according to the first function comprises:
selecting the point $A_i(r_i,g_i,b_i)$ from the original image in the RGB color space; and
according to the first function $f_1(x)$, processing each component of the point $A_i$ of the original image in the RGB color space to obtain $A_0(r_0,g_0,b_0)=f_1(x_i)$,
wherein processing each component of the point $A_i$ of the original image in the RGB color space is to stretch ($\alpha$) and translate ($\beta$) the components of the point $A_i$ in the RGB color space, where the first function is $f_1(x)=\alpha x+\beta$.

12. The method according to claim 10, wherein the processing step according to the second function comprises:
selecting the point $A_i(r_i,g_i,b_i)$ from the original image in the RGB color space;
according to a third function $f_3(x)$, determining saturation $S_i=f_3(x_i)$ of the point $A_i(r_i,g_i,b_i)$ of the original image; and
according to the second function $f_2(x)$, processing the saturation $S_i$ of the original image to obtain the processed saturation $S_0=f_2(x_i)$.

13. The method according to claim 12, wherein the saturation of the point $A_i(r_i,g_i,b_i)$ of the original image is $$S_i = 1 - 3 \times \frac{\min[r_i, g_i, b_i]}{r_i + g_i + b_i};$$

and the processed saturation obtained by processing the saturation $S_i$ of the original image according to the second function $f_2(x)$ is $$S_0 = f_2(x) = 1 - 3 \times \frac{\alpha \cdot \min[r_i, g_i, b_i] + \beta}{r_i + g_i + b_i}.$$

14. The method according to claim 10, wherein brightness of the original image remains unchanged before and after image processing, and values of $\alpha$ and $\beta$ in $f_1(x)$ are obtained using $S_0 = f_2(x_i)$ and $A_0(r_0,g_0,b_0) = f_1(x_i)$.

15. The method according to claim 10, wherein the CMY color space is a color model based on subtractive color mixture, and the point $A_i$ is processed in the CMY color space using a fourth function $f_4(x) = 1-x$, where x represents each component of the point $A_i(r_i,g_i,b_i)$ in the RGB color space.

* * * * *